United States Patent [19]

Lueck

[11] 4,276,031
[45] Jun. 30, 1981

[54] METHOD OF TEACHING

[76] Inventor: Phyllis E. Lueck, 2949 Roosevelt, Dearborn, Mich. 48124

[21] Appl. No.: 133,267

[22] Filed: Mar. 24, 1980

[51] Int. Cl.³ .............................................. G09B 19/00
[52] U.S. Cl. .................................................. 434/260
[58] Field of Search ................. 35/8 R, 56, 1; 434/260

[56] References Cited

U.S. PATENT DOCUMENTS

| 2,501,902 | 3/1950 | Howell | 35/56 |
| 2,527,242 | 10/1950 | Clark | 35/56 |
| 2,972,820 | 2/1961 | Cano | 35/56 |
| 3,546,789 | 12/1970 | Kushell et al. | 35/8 R |

Primary Examiner—William H. Grieb
Attorney, Agent, or Firm—Cullen, Sloman, Cantor, Grauer, Scott & Rutherford

[57] ABSTRACT

A method of teaching comprises successively presenting to a child a series of bags of different sizes, shapes, colors, materials, textures and fasteners for visual inspection and feeling. The fasteners of each bag are different and include grippers, snaps, clips, buckles, hooks and eyes, zippers, shoestring laces, buttons and loops, drawstring, button and button hole and Velcro. The bags are all made of different materials, including cotton cloth, flannel, plastics, abrasives, sponge rubber, elastic and others. Each bag has a panel of a shape, color and material different from the basic color and material of the bag. And each bag has applied to its back panel ornaments in groups from 1 to 10 of different shapes, sizes, color and material, and wherein the ornaments of each group are of uniform size, shape, color and material. Further steps include the successive visually examining and feeling each of the bags for learning to distinguish colors, shapes, sizes, and material and the feeling and visually inspecting of the groups of ornaments for numerical perception and learning. These steps also assist the child in learning to dress himself.

6 Claims, 23 Drawing Figures

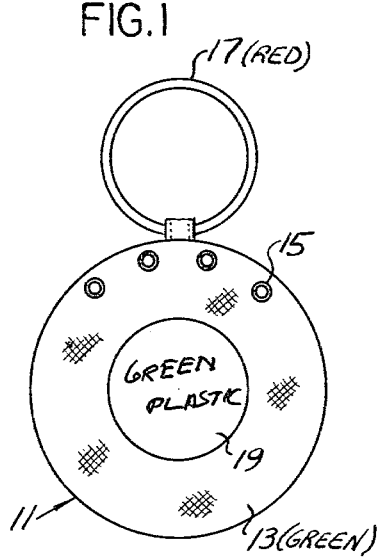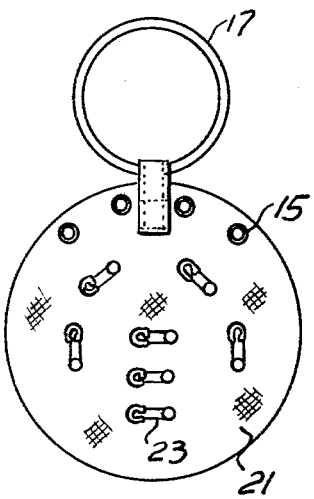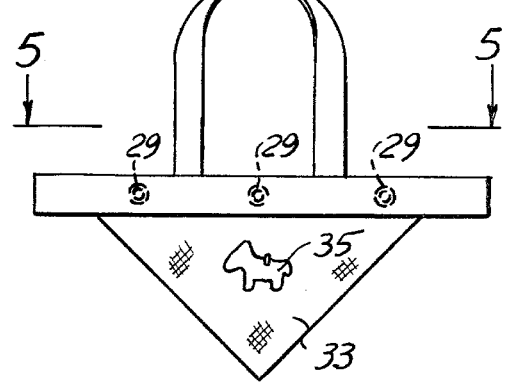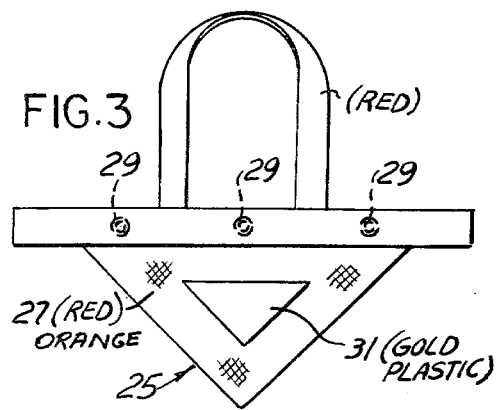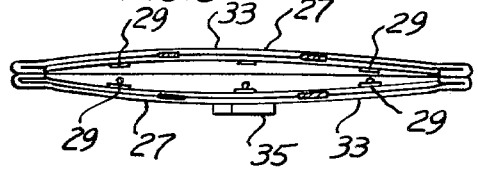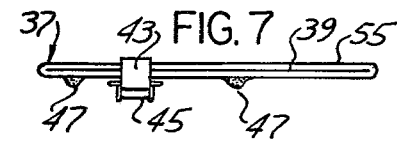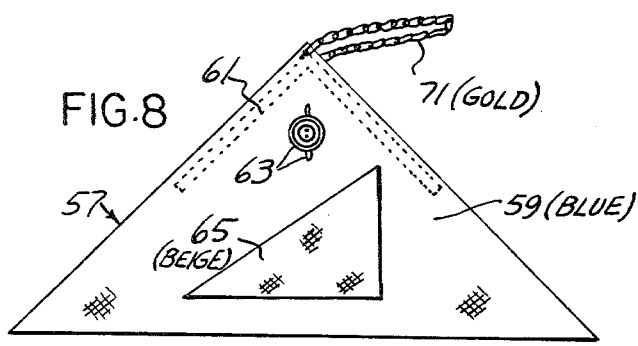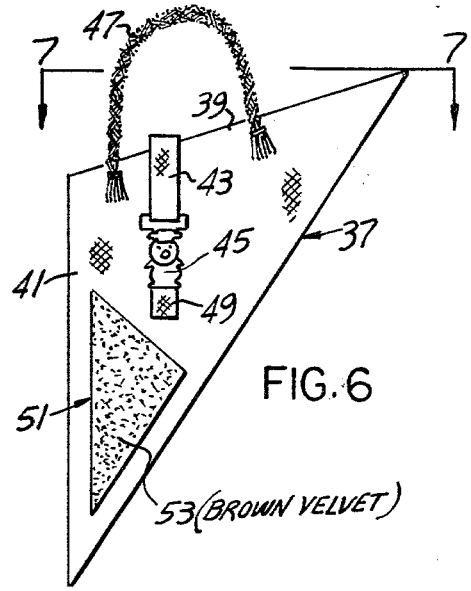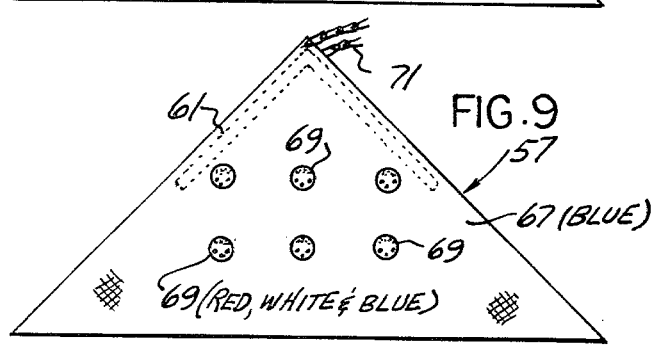

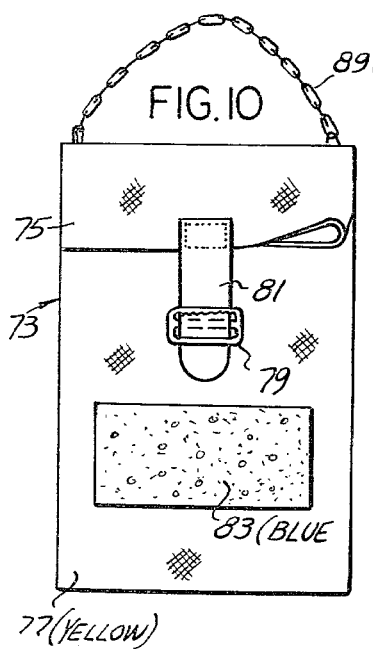
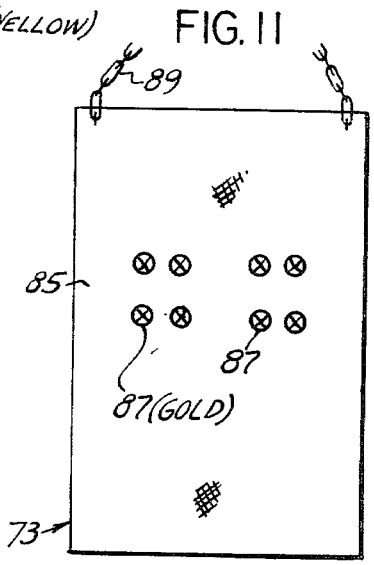
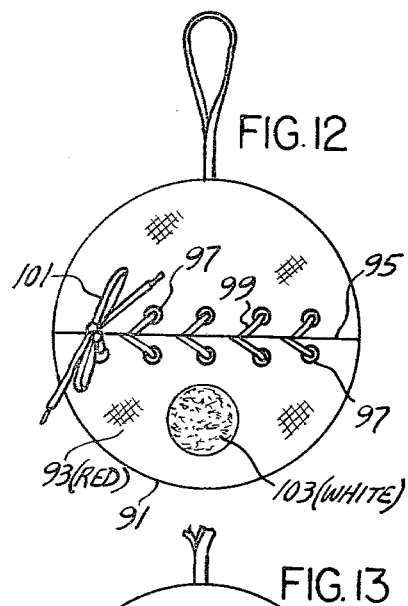
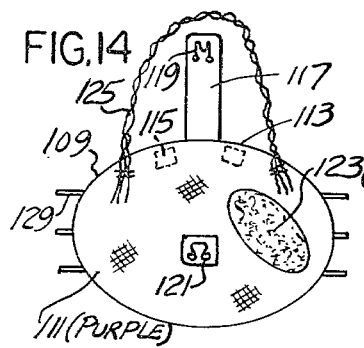
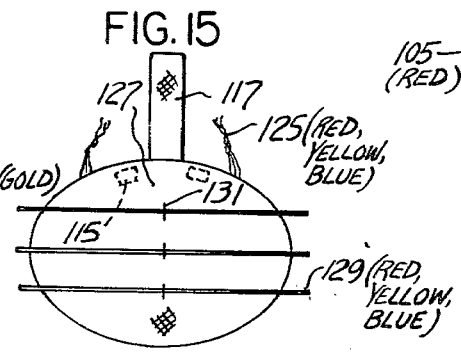
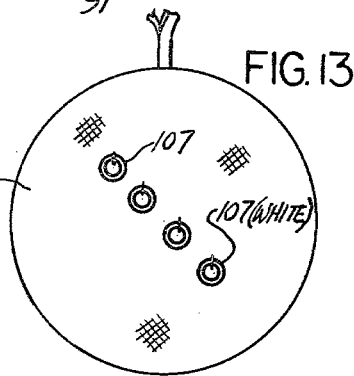
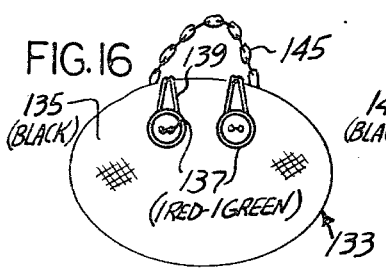
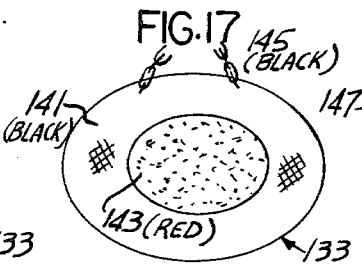
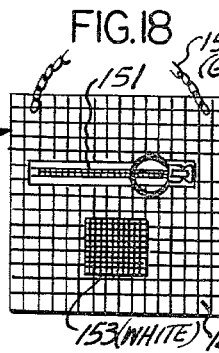
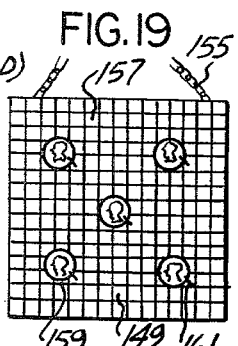
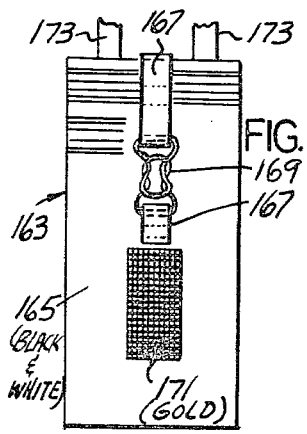
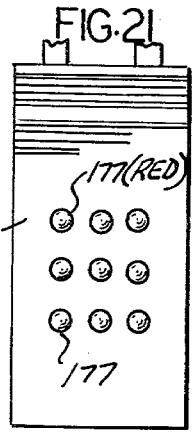
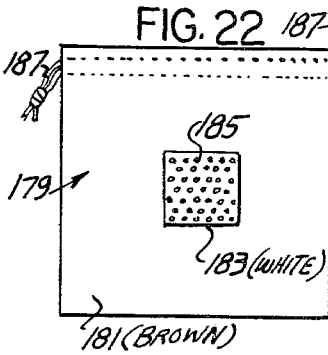
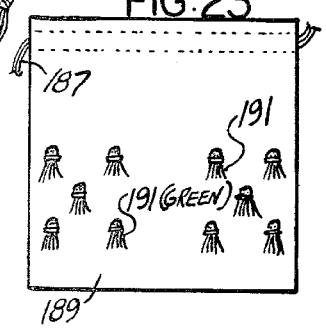

METHOD OF TEACHING

BACKGROUND OF THE INVENTION

In the learning process for children, particularly in the age groups of 3 to 6, very little has been done providing teaching of self-dressing by children due to lack of knowledge of the child to operate the various types of fasteners employed in childrens clothes. To the inventor's knowledge, very little has been done to teach children to distinguish colors, the perception of different shapes in order to distinguish one shape from another, learning by visual inspection to compare the sizes of objects one from another and the learning to recognize by sight and feeling the texture of various materials in order to distinguish one from another. To the inventor's knowledge, little has been done to teach children the concept of zero or the "empty set", and the counting of numbers from 0 to 10, for example, and wherein using sight and feeling perception, each of the numbers may be distinguished one from another, all as applied to the teaching.

SUMMARY OF THE INVENTION

The primary feature of the present invention is to provide a method of teaching children by which, through inspection and feeling, examination and trial and error, a child may successively examine and inspect a series of bags of different sizes, shapes, colors, materials and textures and manipulate different fasteners.

It is a further object to provide each of the bags to be inspected with fasteners of various types respectively, whereby the successive practice manipulation by the child and visual inspection, the child can distinguish and learn to operate various types of fasteners which might appear upon his clothes, and assist the child in learning to dress himself.

A further feature of the present invention resides in the use of bags, all of various colors, whereby on successive visual examination thereof, a child learns to distinguish different colors, specifically as relating to his clothing. A further feature is to provide the bags of various geometric shapes and sizes whereby upon examination and inspection, the child may learn to recognize different shapes and make comparisons as to size.

A further object is to provide such bags as the medium for teaching a child, and including the teaching of dressing, and wherein the respective bags are each constructed of the different materials available, and wherein by visual inspection and manual feeling the child will learn to distinguish one material from the other.

A further feature includes the application to each of the bags of a panel of a predetermined shape of a material different from the basic material on the bag so that upon successive visual and manual inspection and feel, the child can further learn to identify and distinguish materials one from another. The child will also learn through tactile experiences the concepts of rough, smooth, soft, etc.

A further feature incorporates into the bags the learning of numbers by the application to the individual bags of groups of ornaments in numbers from 1 to 10, and wherein the groups are of different sizes, shapes, color and material, but wherein the ornaments in a particular group are uniform as to size, shape, color and material. The manipulation and feeling of the individual groups of ornaments by the child teaches numerical perception based on sight and feeling.

These and other objects are seen from the following specification and claims in conjunction with the appended drawings illustrative of the apparatus employed in the present teaching method.

THE DRAWING

FIG. 1 is a side view of a round bag having a series of grippers.

FIG. 2 is a view of the opposite side thereof.

FIG. 3 is an elevational view of one side of a modified bag using snap fasteners.

FIG. 4 is an elevational view of the opposite thereof.

FIG. 5 is a plan section taken in the direction of arrows 5—5 of FIG. 4.

FIG. 6 is a side view of a modified bag utilizing a mitten clip.

FIG. 7 is a plan view thereof taken in the direction of arrows 7—7 of FIG. 6.

FIG. 8 is an elevational view of one side of a modified bag showing a fastening by button and button hole.

FIG. 9 is an elevational view of the opposite side thereof.

FIG. 10 is an elevational view of one side of a modified bag using a buckle fastener.

FIG. 11 is an elevational view of the opposite side thereof.

FIG. 12 is an elevational view of one side of a different bag with a lace fastener.

FIG. 13 is an elevational view of the opposite side thereof.

FIG. 14 is an elevational view of a bag of oval shape showing a hook and eye fastener.

FIG. 15 is an elevational view of the opposite side thereof.

FIG. 16 is an elevational view of an oval shape bag with button and loop fasteners.

FIG. 17 is an elevational view of the opposite side thereof.

FIG. 18 is a side elevational view of a bag of square shape showing a zipper fastener.

FIG. 19 is an elevational view of the opposite side thereof.

FIG. 20 is an elevational view of one side of a rectangular bag showing a twist buckle fastener.

FIG. 21 is an elevational view of the other side thereof.

FIG. 22 is a side elevational view of a modified bag showing a drawstring fastener.

FIG. 23 is an elevational view of the opposite side thereof.

It will be understood that the above drawings are merely illustrative of various types of bags of various shapes, sizes and colors employed in the present teaching method, and that other embodiments are contemplated within the scope of the claims hereafter set forth.

DETAILED DESCRIPTION OF BAG EMBODIMENTS USED IN METHOD OF TEACHING

In FIGS. 1 and 2, a round bag 11 is shown made of cotton material 13 colored green and having a partially open top, closed by a series of snap fasteners 15, upon the front and back thereof.

The handle 17 is formed from a hard plastic, such as polystyrene, for example, and is in a contrasting red color. Circular panel 19 is of plastic material, is round and colored a contrasting green shade and has a slippery feel compared to the soft cotton. The back panel 19, FIG. 2, is of the same material and has a series of ornaments stitched to the surface thereof in the form of 7 safety pins colored red.

A triangular bag 25 shown in FIGS. 3, 4 and 5, is made of brushed denim 27, which is of the color orange and whose open top is securable by a series of spaced snap fasteners 29, which cooperate with the corresponding fasteners upon the back panel 33, FIGS. 4 and 5. Panel 31 is adhered or stitched to the front surface of the bag, is triangular in shape, corresponding to the bag shape, and is of a satin material and gold in color.

The back panel 33 is orange and has applied thereto a single ornament 35 in the shape of a horse and is constructed of wood.

Triangular bag 37, FIGS. 6 and 7, has an open top 39 and is made of cotton material 41 and includes closure tab 43 with attached mitten clip 45 adapted for removable securing registry with the tab 49. The material of the bag is white, and includes a macrame handle 47 consisting of a series of interwoven strands of the color blue. Panel 51 of triangular shape is applied to the front surface of bag 37, made of velvet or other pile material of a soft texture and is colored brown.

The back panel 55, FIG. 7, is plain and has no ornament on the back thereof, therefore indicative of the "zero" quantity as related to the numbers 0–10.

A modified triangular bag 57 is shown in FIGS. 8 and 9 and is of a size greater than bag 25 of FIG. 3. Bag 57 is constructed of cotton cloth 59, is blue in color and has an open apex at 61, closed by a single button and button hole 63.

The panel 65 of triangular shape is applied to the front surface of bag 57, centrally thereof, is constructed of suede cloth material and is of the color beige.

The corresponding back panel 67, FIG. 9, has applied thereto in a group and in a pair of rows a series of six cotton balls 69 which have faces thereon in the contrasting colors red, white and blue. The elements in the group are similar in appearance and provide the exercise of counting up to six. In this embodiment, the bag has a metallic link chain handle 71 of a gold color.

Illustrative rectangular bag 73, FIGS. 10 and 11, is shown having a closure flap 75, all constructed of a loose weave cotton 77 of a yellow coloring. A metallic buckle 79 is secured to the front face of the bag, is adapted for cooperative registry with the depending tab 81 from flap 75.

A rectangular panel 83 of sponge rubber is applied to the front face of the bag and is blue in color.

The back panel 85 has a group of metal bells or ornaments which are gold in color, numbering eight, which are loosely secured upon said back panel. An ornamental plastic link chain 89 of a yellow color is attached at its ends to the bag.

An illustrative round bag 91 shown in FIGS. 12 and 13, is constructed of a cotton material 93 and is red in color. Its front face has a slitted opening 95 with a series of eyes or eyelets 97 on opposite sides of the opening interconnected by a lace 99. The lace is threaded through the respective eyelets 97 and terminates in the bow 101. Panel 103 of terry cloth and circular is affixed to the front surface and is of the color white for contrast with the red color of the bag body.

The back panel 105, FIG. 13, is plain, also red, and has applied thereto four ornaments in a group, in a form of white rings 107 of a plastic material and suitably stitched thereto.

An oval bag 109 is shown in FIGS. 14 and 15 and is constructed of a cotton material 111 and purple in color. The open top 113 is partly held closed by opposed pairs of Velcro squares 115 upon the interior of the bag and the interior of its back panel 127.

Tab 117 extending from said back panel overlies the open top and mounts an eyelet or eye 119 adapted for cooperative retaining registry with respect to a hook 121 affixed to the front surface of the bag. An oval panel 123 is secured to the front surface of the bag and is made of an abrasive cloth and is gold in color. The bag includes a leather braid handle 125, with the braids in the respective colors red, yellow and blue. The back panel 127 has applied thereto three ornaments or leather strips 129 stitched thereto centrally as at 131 and including the colors red, yellow and blue, respectively.

Another bag 133, FIGS. 16 and 17, of oval shape, and by comparison larger than the bag 109 of FIG. 14, is constructed of a cottonduck 135 and is black in color. Its closure consists of a pair of laterally spaced buttons 137, one red and one green, which are adapted to receive the loops 139 which extend from the back panel 141. The buttons may also be regarded as ornaments in a group of two for counting.

Back panel 141, FIG. 17, has an oval shaped panel insert 143 made of suede and is red in color, contrasting with the black color of the bag. For this purse there is employed a plastic link chain handle 145, FIG. 16, which is black.

A square bag 147 is illustrated in FIGS. 18 and 19 and made of a flannel material 149 and which has a plaid appearance with strips or squares colored red, white and blue and stripes of various colors.

The closure in this case is a plastic zipper 151. Panel 153 of a loose weave cotton material is square in shape and white. A gold metallic chain handle 155 is employed. The corresponding back panel 157, FIG. 19, has applied thereto a series of ornamental gold coins 159 which number five and which are stitched to the back panel flexibly as at 161.

An elongated rectangular bag 163 is shown in FIGS. 20 and 121 and is constructed of a cotton material 165 which has a series of transverse stripes of black and white. The front portion of the bag has a tab 167 spaced from a secondary tab 167 which projects over the open end of the bag and is connected to the back panel 175. Connected to each of the tabs 167 are a pair of symmetrical twist handles 169 of a gold color and constructed of metal. Insert panel 171 of rectangular shape is affixed to the front surface of the bag and is constructed of a metal cloth of a rough texture and is gold in color. Elastic handle 173 at its respective ends is connected to the top open portion of the bag which is closed by the interlocking of the twist buckles in a conventional manner.

The back panel 175 has applied thereto a group of red beads 177 arranged in rows to designate the numeral nine as a counting exercise.

The final illustrative bag 179, FIGS. 22 and 23, is in the form of a large square and is constructed of a denim type of material 181 and is brown in color. Insert panel 183, colored white and rectangular in shape, is affixed to the front surface of the bag 179 and has a series of raised dimples arranged in rows. Interconnecting the back panel 189 with the front panel 177 is a drawstring 187, which is white and serves as a closure and handle for the bag. An ornamental group 191 of ten tassles of green are loosely applied to the back panel 189.

METHOD

The respective bags shown in FIGS. 1-23 have been described as vehicles or specific embodiments of a product established for use with the steps in a learning process for teaching children, particularly in the age groups of 3 to 6.

In the specific embodiments described, the present method is primarily directed to a series of method steps in the presentation of bags of different sizes, shapes, colors, materials, textures and fasteners for visual inspection and feeling, and wherein the respective bags have different types of fastening devices. These fastening devices are referred to as a group of fasteners such as grippers, or gripper snaps 15, FIG. 1; snap fasteners 29, FIGS. 3, 4 and 5; mitten clip 45, FIG. 6; a button and button hole 63, FIG. 8; buckle 79, FIG. 10; shoestring lace 99 and corresponding eyelets, FIG. 12; the hook and eye 119 and 121 of FIG. 14; the buttons 137 and loops 139 of FIG. 16; the zipper 151 of FIG. 18; the twist buckles 169, FIG. 20; drawstring 187 of FIG. 22; and the Velcro fasteners 115, FIG. 14.

Thus the respective bags utilized in the method of teaching respectively employ, as shown in the drawings, various types of fasteners. The present method includes the step of successively feeling, inspecting and practice manipulating of the respective fasteners from the whole group of fasteners encountered by a child in his clothing. This feeling, inspecting and practice manipulating facilitates in the learning of self-dressing of a child using various types of fastening devices.

The respective bags are surface shaded to show contrasting colors in the whole range which includes brown, white, green, gray, gold, blue, red, black, purple, yellow, beige and plaid. Young children like and respond to bright colors.

By the use of the group of bags, the child performs a step in the learning process, successively and visually examines the respective bags to facilitate learning and perception of and distinguishing of different colors one from another, and more specifically as related to his clothing.

The respective bags above described are of different geometrical shapes, such as round, oval, rectangular, square and triangular. Accordingly, a step in the present method includes the successive visual examining by the child of each of the bags and comparing the shapes thereof. Learning of shapes is related to pre-reading. Children must be aware of the shapes of b, d, p, and q, for instance, before they can read. Shapes are also related to early mathematics learning.

As shown in the drawings, the respective bags are of different sizes, so that in the learning process there is an opportunity of visually inspecting and comparing the bags as to size so that the child can reach determinations that one bag is "bigger than" another or one bag is "smaller than" another. This teaching of inspection and comparison as relating to variations in size relates to beginning mathematical concepts.

This learning process also includes an understanding and capability of distinguishing fabrics and textures one from another. Accordingly, the respective illustrative bags use one or more materials of different textures which include cotton cloth, brushed denim, terry cloth, suede, flannel, canvasduck, plastic solids, plastic sheet, satin, velvet, rayon, abrasive cloth, sponge rubber, wood, metal and elastic. Since these all have a different appearance and a different feel to the child, the present method includes a step of visually inspecting the respective bags as to material and manually feeling and sensing the materials in order that the child may distinguish one material from the other. Young children comprehend more fully with a concrete experience while at a later age a verbal description and/or a picture will suffice. We attempt to give the child a wide range of concrete experience so as to help him build concepts about his environment and himself.

The teaching process is further assisted by the additional step of providing upon the respective bags on one side thereof a panel of a predetermined shape and of a material different from the basic material of the bag. Accordingly, in the step of successively and visually inspecting the bag and the panel applied thereto and manually sensing and feeling the respective panels, this also facilitates in the learning of and identifying different materials and distinguishing one material from another. Discussing these materials with him would help to build his vocabulary also.

As part of the learning process, generally there has been provided upon the respective illustrative bags ornaments in groups which are individually numbered from 1 to 10, and wherein the ornaments in a particular group are uniform as to size, shape, color and material. The ornaments in the various groups are of different shapes for comparison, different sizes, different colors and different materials. Thus, the present method includes the successive visual inspecting by the child and manipulating the individual groups of ornaments on each bag for numerical perception and the learning of numbers and in comparing numbers based upon sight and feeling. Little children are often taught to say numbers without any understanding of the 'numerousness' of the number.

The foregoing steps may be combined or may be steps individually employed in the learning process as set forth in the foregoing description of the respective bags and materials, their size, shapes and colors and the numerical counting designations thereon.

For example, in the learning process in FIG. 1, the handle is of a hard plastic at 17 and is red, but the plastic panel 19 of a contrasting different color, green, is slippery and thus provides a different sensation to the child. It is noted further that the ornaments, in the case of FIG. 2 as safety pins 23, are not removable, being stitched to the back panel, but are of a color which matches the handle.

The satin panel 31 of FIG. 3 has a different feeling from the plastic panel 19 of FIG. 1 and is smoother. The three dimensional ornament in the form of a horse made of wood, shown at 35, FIG. 4, relates to the step of visual examining and feeling as part of the learning process and for designation of the number 1. In order for a child to understand what he reads he must have a wide background of experiences.

the manual feeling of the insert 51 of velvet or other heavy pile is soft and warm as compared with more hard surface inserts, such as the plastic insert 19, FIG. 1. The respective bags have inserts applied thereto of colors which are contrastingly different from the colors of the basic material of the front and back panels as a part of the learning process and in the perception of contrasting colors and the identification thereof to distinguish one from another.

Contrastingly colored blue macrame handle 47, FIG. 6, has a different feeling from the cloth handles of FIG. 3. The bag 57 of FIG. 8 is generally blue, has a panel 65, which is beige, and is made of an suede or similar material and has a different feel from the material 59 of the bag made of a cotton material and is triangular.

Bag 73 of FIG. 10 has a panel insert 83 of sponge rubber and colored blue in contrast to the yellow coloring of the loose mesh material 77.

The illustrative ornaments in the form of bells 87, FIG. 11, on the back panel 85 of bag 73 provide counting up to the number 8 and also appeals to a further sense of hearing. In attempting to promote curiosity, such curiosity leads to motivation for learning.

The terry cloth insert 103, white in color, contrasts with the cotton material 93 of red coloring, shown in FIG. 12. The insert panel 123, FIG. 14, of an abrasive cloth and gold in color, contrasts with the soft cottony material 111 of purple coloring.

The leather braided handle 125 of mutiple primary colors for visual inspection has an entirely different feel to the child than the three individual leather strands stitched to back panel 127 of the bag and respectively red, yellow and blue. These are for the purpose of learning to tie knots.

The bag of FIG. 16 shows a series of contrasting colors, namely, the basic black canvas duck type of material 135, the red and green buttons 137 and upon the back panel 141 the red insert panel 143, which is made of suede, having a clearly different feel and appearance from the canvas duck.

In the learning process of comparing sizes, the child on visual inspection will note that bag 133, FIG. 16, of oval shape is "larger than" bag 109, FIG. 4. Further in the learning process, the child also reaches the conclusion that bag 109 is "smaller than" bag 133.

The present teaching method therefore utilizes structure of various types of bags, being of different shapes and sizes, different colors, different materials, utilizing different fasteners and having a different group of ornaments of varying numbers as directed to the perception of numerical count by visual examination and feeling.

The foregoing bags used in the method steps are beneficial in the learning process, particularly in learning to dress by oneself for children in the lower age groups, more specifically for the capability to use the various types of fasteners, recognition of various colors, comparison of sizes and shapes and the understanding of the designation "zero" as distinguished from the numbers 1 to 10.

The present illustrations of bags include all or most of the various types of fasteners most likely encountered by children in their clothes when they are learning to dress themselves. Accordingly, the inspection, manipulation and feeling of the respective fasteners, using them and trying them and practicing upon them, are aids in the learning process, and particularly the different manipulations of the hands in opening and closing the respective fasteners.

The present method of teaching is at the same time entertaining to the child, helps the child practice coordination and improves the child's awareness as to the existence of the various materials described as well as the various colors normally encountered every day by a child in viewing general objects, specifically his clothes.

Having described my invention, reference should now be had to the following claims.

I claim:

1. The method of teaching, which comprises successively presenting to a child a series of bags of individually different sizes, shapes, colors, materials, textures and fasteners for visual inspection and feeling;
   the fasteners being selected from the group consisting of grippers, snaps, mitten clips, buckles, hooks and eyes, twist buckles, zippers, shoestring lace with eyes, buttons and loops, drawstring, button with button hole and Velcro;
   successively feeling, inspecting and practice manipulating of the respective fasteners as related to the group of said fasteners which are encountered by a child in his clothing and facilitating the learning of self-dressing;
   the bags being respectively round, oval, rectangular, square and triangular;
   and successive visual examining by the child of each of the bags and comparing and recognizing the respective shapes, facilitating by practice the learning of different shapes as related to his clothing, and related to pre-reading.

2. In the method of claim 1, and visually inspecting and comparing by the child of the respective sizes of each bag as an aid in the learning of size comparison, such as "bigger than" and "smaller than", and specifically as related to his clothing.

3. The method of teaching, which comprises successively presenting to a child a series of bags of individually different sizes, shapes, colors, materials, textures and fasteners for visual inspection and feeling;
   the fasteners being selected from the group consisting of grippers, snaps, mitten clips, buckles, hooks and eyes, twist buckles, zippers, shoestring lace with eyes, buttons and loops, drawstring, button with button hole and Velcro;
   successively feeling, inspecting and practice manipulating of the respective fasteners as related to the group of said fasteners which are encountered by a child in his clothing and facilitating the learning of self-dressing;
   each bag having applied to one surface thereof a panel of predetermined shape of a material different from the basic material of each bag;
   and the successive viasually inspecting by the child and manually sensing the feel of the respective panels, facilitating the learning of and identifying different materials and distinguishing one material from another.

4. The method of teaching, which comprises successively presenting to a child a series of bags of individually different sizes, shapes, colors, materials, textures and fasteners for visual inspection and feeling;
   the fasteners being selected from the group consisting of grippers, snaps, mitten clips, buckles, hooks and eyes, twist buckles, zippers, shoestring lace with eyes, buttons and loops, drawstring, button with button hole and Velcro;
   successively feeling, inspecting and practice manipulating of the respective fasteners as related to the group of fasteners which are encountered by a child in his clothing and facilitating the learning of self-dressing;
   each of the bags having applied to one side thereof ornaments in groups, respectively from one to ten, of different shapes, sizes, color and material;
   the ornaments of each group being uniform as to size, shape, color and material;

and successive visually inspecting by the child and manipulating the individual groups of ornaments on each bag for numerical comprehension based on sight and feeling.

5. The method of teaching, which comprises successively presenting to a child a series of bags of individually different sizes, shapes, colors, materials, textures and fasteners for visual inspection and feeling;

the fasteners being selected from the group consisting of grippers, snaps, mitten clips, buckles, hooks and eyes, twist buckles, zippers, shoestring lace with eyes, buttons and loops, drawstring, button with button hole and Velcro;

successively feeling, inspecting and practice manipulating of the respective fasteners as related to the group of fasteners which are encountered by a child in his clothing and facilitating the learning of self-dressing;

the bags being of different colors and respectively selected from the group consisting of the colors brown, white, green, gray, gold, blue, red, black, purple, yellow, beige, orange, striped and plaid;

the successive visually examining of each of the bags by the child facilitating the learning and perception of and distinguishing different colors, as related to his environment;

the bags being respectively round, oval, rectangular, square and triangular;

and the successive visually examining by the child of each of the bags and his comparing recognition of the respective shapes, facilitating by practicing the learning of different shapes as related to his clothing, and in his world enhancing a young child's observational skills.

6. In the method of claim 5, visually inspecting and comparing by the child the respective bag sizes of each bag to aid in the learning of size comparisons, such as "bigger than" and "smaller than", the material of the bags being respectively cotton cloth, brushed, denim, terry cloth, suede, flannel, canvas duck, plastic solids, plastic sheet, satin, velvet, rayon, abrasive cloth, sponge rubber, wood, metal and elastic;

visually inspecting the respective bags as to materials and manually sensing the feel of each material and distinguishing one material from the other;

each bag having applied to one surface thereof a panel of predetermined shape of a material different from the basic material of each bag;

and the successive visual inspecting by the child manually sensing the feel of the respective panels facilitating the learning of and identifying of the different materials and distinguishing one material from another;

each of the bags having applied to one side thereof, ornaments in groups from one to ten of different shapes, sizes, colors and materials;

the ornaments of each group being uniform as to size, shape, color and material, and the successive visually inspecting by the child and manipulating of the individual groups of ornaments on each bag for learning numerical perception based upon sight and feeling.

* * * * *